United States Patent [19]

Bruestle

[11] Patent Number: 5,146,752
[45] Date of Patent: Sep. 15, 1992

[54] EXHAUST GAS TURBOCHARGER ON AN INTERNAL-COMBUSTION ENGINE

[75] Inventor: Claus Bruestle, Heimsheim, Fed. Rep. of Germany

[73] Assignee: Dr. Ing. h.c.F. Porsche AG, Fed. Rep. of Germany

[21] Appl. No.: 623,674

[22] Filed: Dec. 6, 1990

[30] Foreign Application Priority Data

Dec. 18, 1989 [DE] Fed. Rep. of Germany ....... 3941715

[51] Int. Cl.$^5$ ............................................ F02B 37/12
[52] U.S. Cl. ...................................... 60/602; 415/164
[58] Field of Search ................. 60/600, 601, 602, 603; 415/151, 163, 164

[56] References Cited

U.S. PATENT DOCUMENTS

| | | | |
|---|---|---|---|
| 1,816,787 | 7/1931 | Moss | 60/602 |
| 4,658,586 | 4/1987 | Iwasa | 60/602 |
| 4,770,603 | 9/1988 | Engels et al. | 415/164 X |
| 4,893,474 | 1/1990 | Miller et al. | 60/602 |

FOREIGN PATENT DOCUMENTS

| | | |
|---|---|---|
| 3507095 | 9/1985 | Fed. Rep. of Germany . |
| 3531296 | 3/1986 | Fed. Rep. of Germany . |
| 3606944 | 9/1987 | Fed. Rep. of Germany ........ 60/602 |

Primary Examiner—Michael Koczo
Attorney, Agent, or Firm—Evenson, Wands, Edwards, Lenahan & McKeown

[57] ABSTRACT

Pivotable guide blades are arranged in an exhaust gas turbocharger in front of the turbine wheel inlet for charge pressure control in, for example, an internal combustion engine. These guide blades are moved by an adjusting ring so that an adaptation of the charge pressure takes place to the exhaust gas which rises with the rotational speed of the engine. When the rotational speed is further increased, the exhaust gas blow-off takes place by way of an integrated blow-off device. The guide blades and the blow-off device are actuated by a single actuator.

20 Claims, 4 Drawing Sheets

EXHAUST GAS TURBOCHARGER ON AN INTERNAL-COMBUSTION ENGINE

BACKGROUND AND SUMMARY OF THE INVENTION

The present invention relates to an exhaust gas turbocharger and, more particularly, to an exhaust gas turbocharger for an internal-combustion engine in which the turbine drives a compressor and has an adjusting mechanism for influencing the turbine flow conditions such that a blow-off device and the adjusting mechanism can be actuated by a single actuator.

It is generally known to control the performance of the turbine of an exhaust gas turbocharger in order to achieve a favorable course of the torque in a wide rotational speed range of an internal-combustion engine. The limits of the performance control are set by, among other things, the relationship between the maximal and the minimal turbine mass flow, the so-called absorption capacity The control is primarily possible only by an adaptation of the absorption capacity because, in the case of an existing internal-combustion engine, the exhaust gas mass flow is established by the working volume and the rotational speed. If the exhaust gas offered by the internal-combustion engine rises above a maximally permissible turbine mass flow, the performance of the turbocharger compressor will rise and thus the charge pressure will rise. In order to avoid any resulting damage to the internal-combustion engine, it is known to lower the overall efficiency of the turbocharger by not making a part of the exhaust gas quantity available to the turbine wheel.

In the German Patent DE 35 07 095 C2, a charge pressure control arrangement of an exhaust gas turbocharger is disclosed in which a throttle valve arranged in front of the turbine inlet controls the turbine performance, and a blow-off valve guides a portion of the exhaust gase past the turbine if the rotational speed of the engine continues to increase. The throttle valve and the blow-off valve are actuated by one actuator respectively. The actuators are controlled by a control device on the basis of the rotational speed of the engine and supplied intake air. The entire charge pressure control therefore requires high expenditures and the coordination of the two actuators with respect to one another presents problems.

German Patent DE-OS 35 31 296 shows a control arrangement having a turbocharger with a variable performance in which blades in front of the turbine wheel inlet can be adjusted into four different positions for the control of the charge pressure. The adjustment takes place by way of compressed air as a function of the power and the rotational speed of the engine. The disadvantage of this control arrangement is the non-continuous adjusting of the blades in four steps and the high mechanical expenditures of the blade adjusting arrangement.

It is an object of the present invention to provide an exhaust gas turbocharger which, in a wide rotational speed range of an internal-combustion engine, permits an adaptation to the compressor performance required for a desired charge pressure and is constructed in a manner that is as simple as possible.

According to the invention, this object is achieved by actuating the adjusting mechanism and a blow-off device which guides a portion of the exhaust gases past the turbine by a single common actuator.

The exhaust gas turbocharger according to the present invention makes it possible with a single actuator to continuously actuate the guide blades at the turbine inlet and thus control the charge pressure over a wide rotational speed range, as well as to actuate a blow-off device integrated into the turbine which permits a further increasing of the rotational speed of the engine without causing the charge pressure to rise to impermissibly high values. The problem of the coordination of several actuators with respect to one another therefore does not exist. The actuator may, for example, be a conventional pneumatic pressure element which is controlled by the pressure existing between the compressor and the internal-combustion engine. The integration of an adjustable turbine geometry and the blow-off device inside the turbine casing permits a compact construction and a secure actuation, first, of the guide blades in a first area and, following that, of the blow-off device in a second area.

BRIEF DESCRIPTION OF THE DRAWINGS

Other objects, advantages and novel features of the present invention will become apparent from the following detailed description of the invention when considered in conjunction with the accompanying drawings wherein.

DETAILED DESCRIPTION OF THE DRAWINGS

Figure 3:
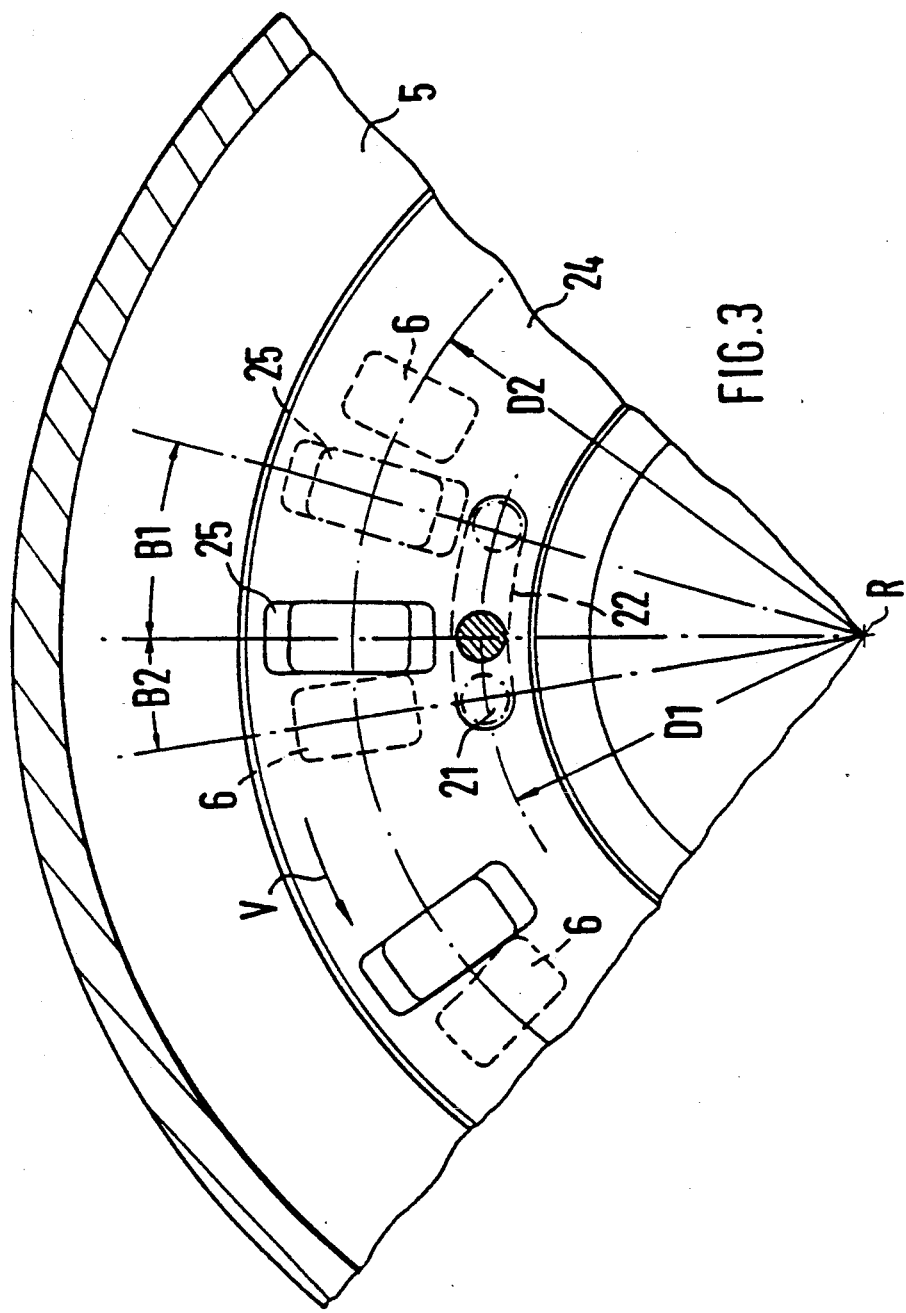
FIG. 3 is a sectional view along Line III—III in FIG. 1.

An exhaust gas turbocharger 1 for an internal-combustion engine (not shown) has a turbine casing 2 in which a turbine wheel 3 is disposed so that it can be rotated around an axis of rotation R. The casing 2 comprises, among other things, first and second casing walls 4, 5, with several openings 6 being arranged in the second casing wall 5 in a radially exterior area D2 (FIG. 3).

Figure 4:
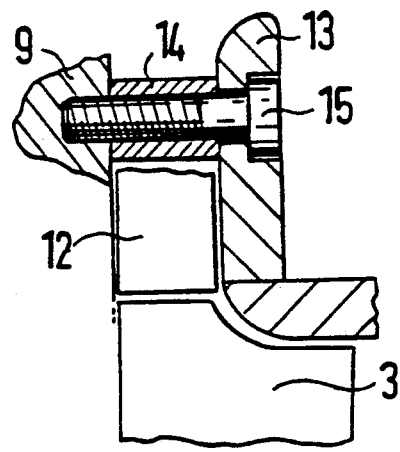
FIG. 4 is a sectional view through parts of the turbine casing.

An adjusting mechanism 7 for influencing the flow conditions in the turbine and a blow-off device 8 for a portion of the exhaust gases are integrated into the turbine casing 2. In the first casing wall 4, an annular guide blade support 9 is mounted which has circularly arranged receiving devices 10. In each receiving device 10, a pin 11 is rotatably disposed with one of its end, and a guide blade 12 is fastened on the pin 11. The other end of the pins 11 is disposed in a partition 13 which is arranged in parallel between the casing walls 4, 5. The partition 13 is fastened to the guide blade support 9 by spacing sleeves 14 and screws 15 (FIG. 4). The length of the sleeve 14 is slightly larger than the width of the guide blades 12 so that a narrow tolerance gap is created between the guide blades 12 and each of the guide blade support 9 and the partition 13. The casing wall 4 and the partition 13 form an inlet duct 16.

An adjusting ring 17 is rotatable around the axis R, and is disposed coaxially inside the guide blade support 9 in a U-shaped recess 18 of the first casing wall 4 by rollers 19. On its circumference, the adjusting ring 17 has two diagonally opposite threads 20 into which driving pins 21 are screwed. These driving pins 21 extend in parallel to the axis R up to in front of the opposite casing wall 5 and penetrate the partition 13 through oblong holes 22 shown in FIG. 3.

Together with the second casing wall 5, the partition 13 forms a secondary duct 23. In this secondary duct, a slide 24, rotatable around the axis R, is arranged directly in front of the wall 5. In the radially exterior area D2, this slide 24 has openings 25. The driving pins 21 are disposed in the slide 24 in a driving opening 26 and are supported in a groove 27 of the wall 5 by rollers 28.

Stops 29 projecting into the inlet duct 16 are mounted on the guide blade support 9. The adjusting ring 17 has blade-shaped driving devices 30 which also project into the inlet duct 16.

Figure 1:
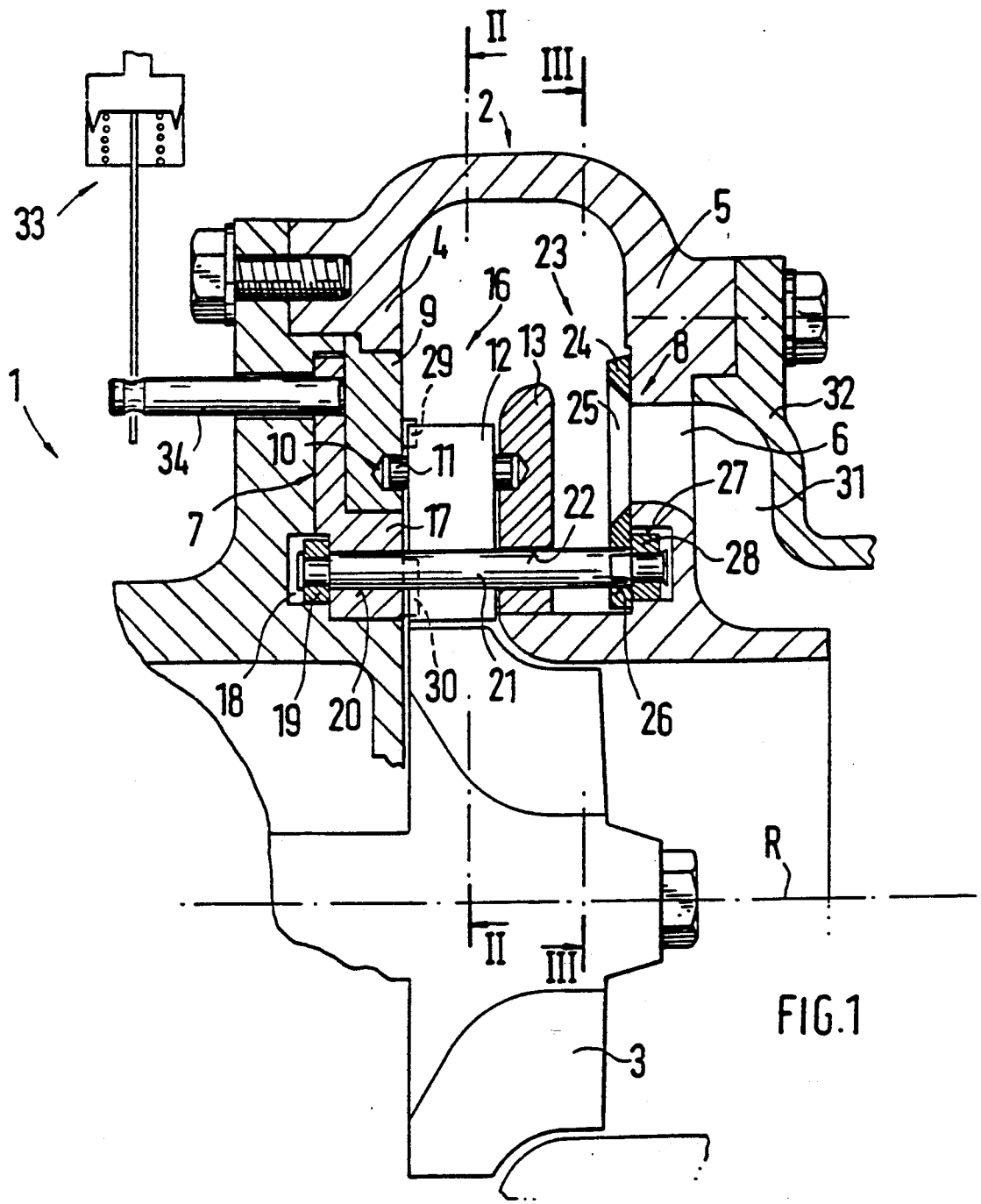
FIG. 1 is a sectional view of a turbine casing of a turbocharger in accordance with one embodiment of the invention.
Figure 2:
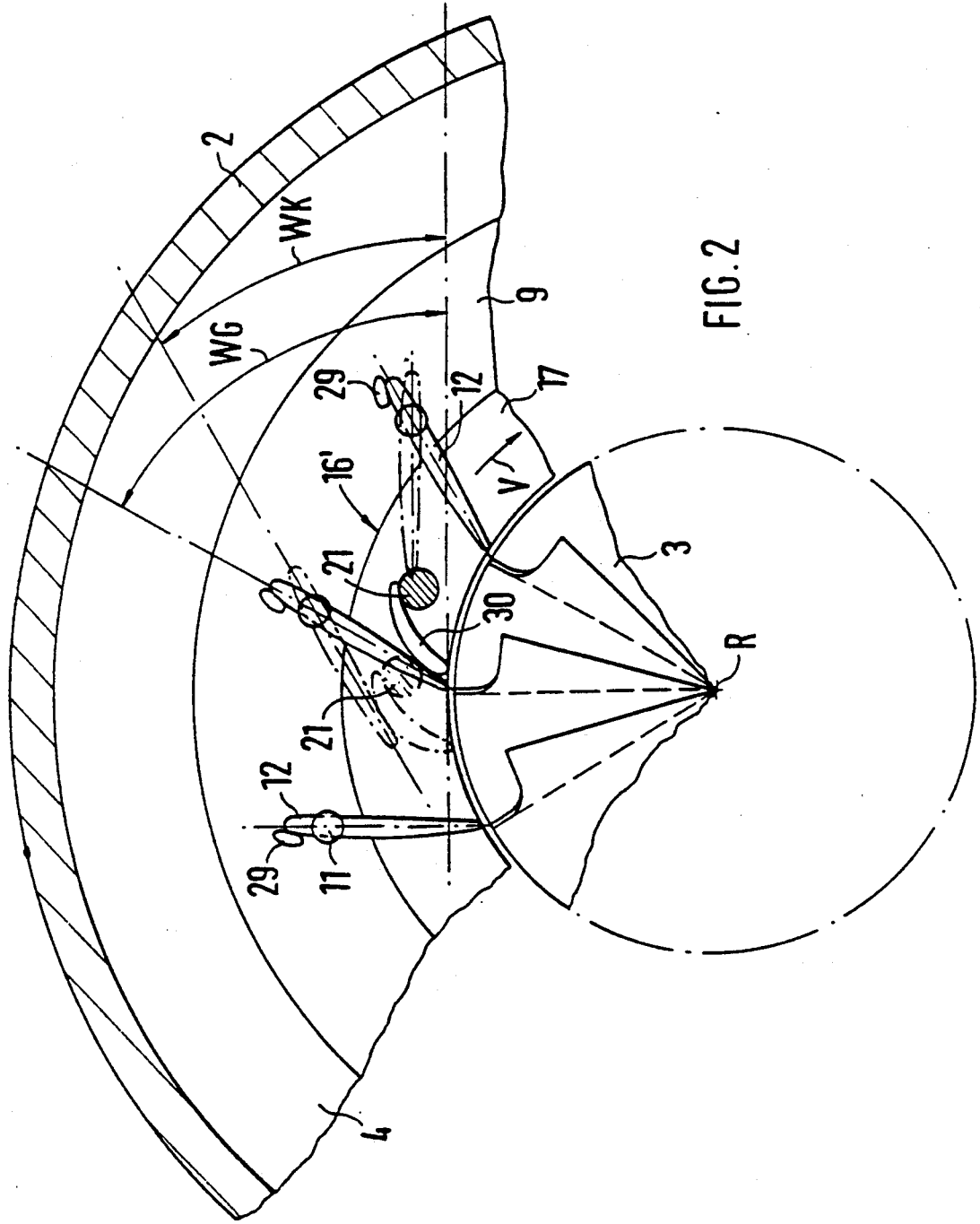
FIG. 2 is a sectional view along Line II—II in FIG. 1.

In the above described exhaust gas turbocharger, the flow conditions of the exhaust gases can first be changed in the inlet duct 16 by a rotating of the adjusting ring 17 within a first area B1 shown in FIG. 3. In this case, the driving devices 30 of the adjusting ring 17 are in contact with the rotatably disposed guide blades 12. In order to achieve a charge pressure that is as high as possible at low rotational speeds of the engine, the rotational speed of the turbocharger must be increased. This is achieved by reduction of the turbine absorption capacity by adjusting the adjusting ring 17 according to FIG. 2 against the direction of the arrow V. Thus, the driving devices 30 rotate the guide blades 12 around the pins 11 clockwise into the position shown by dash-dot lines in FIG. 2; i.e., the blades 12 are disposed at a small angle WK with respect to the turbine wheel 3. The resulting small cross-sectional surface of inlet ducts 16' between adjacent guide blades 12 increases the flow rate of the exhaust gas flow and thus the rotational speed of the turbocharger.

When the rotational speed of the engine rise, the adjusting ring 17 is rotated in the direction of the arrow V so that the angle is enlarged between the guide blades 12 and the turbine wheel 3. The resulting enlarged cross-sectional surface of the inlet ducts 16' increases the absorption capacity of the turbine and keeps the charge pressure level constant despite the rising rotational speed of the engine. Starting from a certain position of the adjusting ring 17, the driving devices 30 arranged on the ring 17 lose contact with the guide blades 12 so that the guide blades hang freely in the exhaust gas flow and automatically attempt to adjust a large angle with respect to the turbine wheel 3. In order not to exceed the geometrically caused maximum absorption capacity, this angle is limited to the angle WG by means of the stops 29.

When the rotational speed of the engine continues to rise, the exhaust gas flow in the inlet duct 16 can no longer be influenced so that the charge pressure would rise to impermissibly high values. In order to avoid this undesirable operating condition, the blow-off device 8 is actuated by further rotation of the adjusting ring 17 in the direction of arrow V beyond the area B1 (FIG. 3) by way of the driving pins 21.

During the above-described rotation of the adjusting ring 17 in the area B1, the driving pins 21 move in the oblong holes 22 of the partition 13, and the slide 24 is moved synchronously with respect to the adjusting ring 17. The openings 25 of the slide 24, in this instance, do not overlap with the openings 6 of the second casing wall 5.

By a further rotation of the adjusting ring 17 in a area B2, the openings 25 and 6 are caused to overlap. Thus a partial current of the exhaust gas entering into the turbine casing 2 can flow into a bypass duct 31 through the secondary duct 23 and the openings 25, 6. This bypass duct 31 is formed between the casing wall 5 and a flange 32 screwed onto it and guides the exhaust gases past the turbine wheel 3 downstream back into the main exhaust gas flow which drives the turbine wheel 3. The slide 24 is radially supported by way of the driving pins 21 and the rollers 28, and is axially pressed against the casing wall 5 by the pressure existing in the secondary duct 23. The admixing of the partial current into the main exhaust gas flow takes place coaxially and thus with low losses at the end of the bypass duct 31.

Despite an increasing rotational speed of the engine and thus a rising offering of exhaust gas, the charge pressure remains at a permissible level because the covering of the openings 25 and 6 increases with an increasing amount of exhaust gas and thus the excess exhaust gas is removed by the blow-off device 8.

When the rotational speed of the engine decreases, the above-described change of the exhaust gas flow conditions takes place in the reverse sequence. First, the slide 24 closes the openings 25 with respect to the openings 6 in the area B2; then the turbine geometry is changed by rotation of the guide blades 12 in area B1 to such an extent until the angle WK is created between the blades 12 and the turbine wheel 3.

Since the adjusting ring 17 actuates the adjusting mechanism 7 as well as the blow-off device 8, only a single actuator 33 is required for actuation of the adjusting ring 17. The rotation of the adjusting ring 17 takes place in a known manner by way of this actuator 33. For example, the actuator can include a spring-loaded diaphragm cell acted upon by the suction pipe pressure of the engine and a linkage, or by way of an electric signal derived from several control variables. The actuator 33 acts upon the adjusting ring 17 through a shaft 34.

Figure 5:
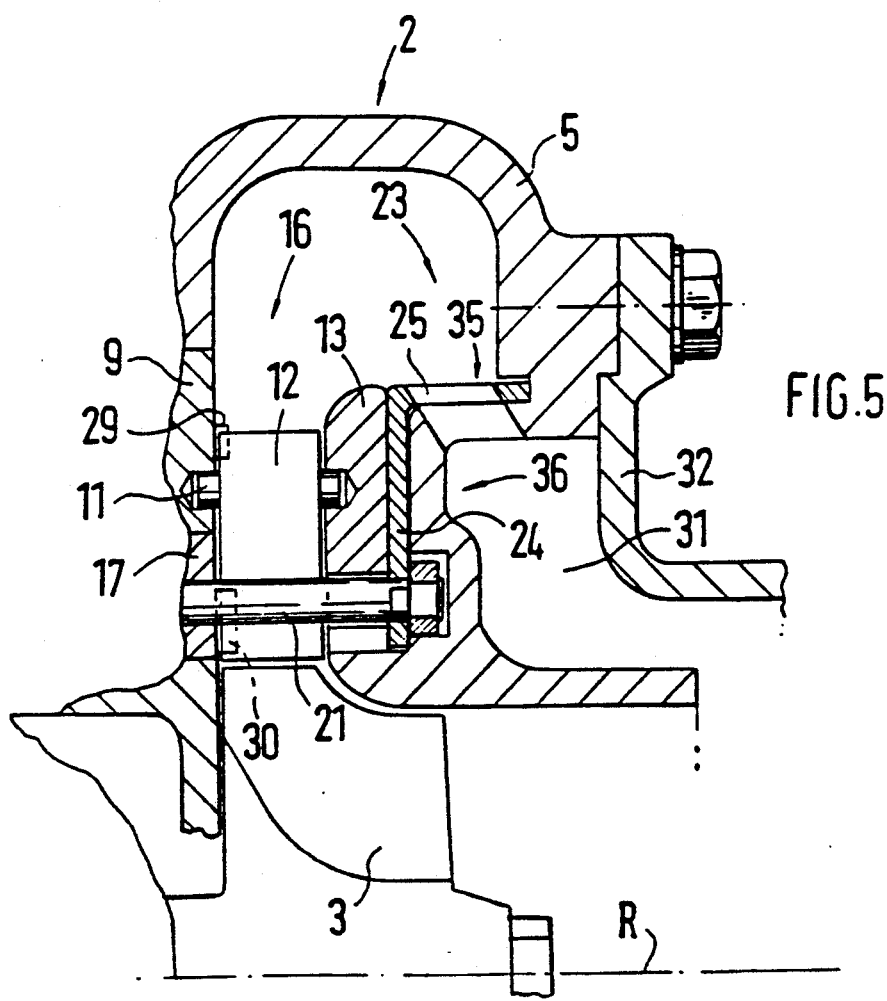
FIG. 5 is a sectional view of the turbine casing of another embodiment of the invention.

In another embodiment of the present invention according to FIG. 5, the slide 24 has an L-shaped construction. The opening 25 is arranged in the upper part 35 of the slide 24 extending in parallel to the axis of rotation R. The adjustment of the variable turbine geometry and of the slide 24 takes place in the same manner as in the first embodiment of the invention. The casing wall 5 has a setoff 36 which, together with the flange 32 bounds the bypass duct 31.

Although the invention has been described and illustrated in detail, it is to be clearly understood that the same is by way of illustration and example, and is not to be taken by way of limitation. The spirit and scope of the present invention are to be limited only by the terms of the appended claims.

What is claimed is:

1. An exhaust gas turbocharger on an internal-combustion engine, comprising a turbine for driving a compressor, adjustable guide blades adjustably arranged with respect to the turbine, an adjusting mechanism operatively arranged in a first lateral casing wall of the turbocharger for adjusting the adjustable guide blades to influence the flow conditions in the turbine, a blow-off device arranged in a second lateral casing wall of the turbocharger to guide a portion of the exhaust gases past the turbine, and a single common actuator for actuating both the adjusting mechanism and the blow-off device, wherein the adjusting mechanism includes an adjusting ring rotatable about an axis of rotation of a turbine wheel and a driving device for adjusting the guide blades.

2. An exhaust gas turbocharger according to claim 1, wherein the adjusting mechanism and the blow-off device 8 are arranged in the turbine casing.

3. An exhaust gas turbocharger according to claim 1, wherein rollers are provided to dispose the adjusting ring n a recess of a turbine casing wall.

4. An exhaust gas turbocharger according to claim 1, wherein a shaft penetrating a first turbine casing wall is arranged at the adjusting ring, and the actuator is operatively applied to the shaft.

5. An exhaust gas turbocharger according to claim 1, wherein the adjusting mechanism actuates the guide blades by a first rotation and actuates the blow-off device by a second rotation which follows the first rotation.

6. An exhaust gas turbocharger on an internal-combustion engine, comprising a turbine with a turbine wheel for driving a compressor, adjustable guide blades adjustably arranged in the turbocharger with respect to the turbine wheel, an adjusting mechanism operatively arranged for adjustment of the adjustable guide blades to influence the flow conditions in the turbine and having an adjusting ring rotatable about an axis of rotation of the turbine wheel and a driving device for adjusting the guide blades, a blow-off device arranged in the turbocharger to guide a portion of the exhaust gases past the turbine, and a common actuator for actuating the adjusting mechanism and the blow-off device, wherein the adjusting ring has driving pin fastened thereto to actuate the blow-off device.

7. An exhaust gas turbocharger according to claim 6, wherein the blow-off device has a slide rotatable about the axis of rotation of the turbine wheel and in a radially interior area thereof, driving openings are arranged for receiving the driving pins and, in a radially exterior area thereof, openings are arranged for release of the exhaust gas.

8. An exhaust gas turbocharger according to claim 6, wherein the blow-off device has an L-shaped slide which can be rotated around the axis of rotation of the turbine wheel and in which, in a radially interior area thereof, driving openings are arranged for guiding the driving pins and, in a bent portion thereof, openings are arranged for release of the exhaust gas.

9. An exhaust gas turbocharger according to claim 7, wherein, inside the turbine casing, parallel to first and second casing walls thereof, a partition is arranged in such a manner that an inlet duct is formed between the partition and the first casing wall, and a secondary duct is formed between the partition and the second casing wall.

10. An exhaust gas turbocharger according to claim 8, wherein, inside the turbine casing, parallel to first and second casing walls thereof, a partition is arranged in such a manner that an inlet duct is formed between the partition and the first casing wall, and a secondary duct is formed between the partition and the second casing wall.

11. An exhaust gas turbocharger according to claim 9, wherein, in the inlet duct, the guide blades are rotatably suspended between the partition and a portion of the casing wall constructed as the guide blade support by pins.

12. An exhaust gas turbocharger according to claim 10, wherein, in the inlet duct, the guide blades are rotatably suspended between the partition and a portion of the casing wall constructed as the guide blade support by pins.

13. An exhaust gas turbocharger according to claim 7, wherein openings are arranged in a casing wall on a radial circumference which, together with the openings of the slide, form an outlet for the exhaust gases from a secondary duct into a bypass duct.

14. An exhaust gas turbocharger according to claim 8, wherein openings are arranged in a casing wall on a radial circumference which, together with the openings of the slide, form an inlet for the exhaust gases from a secondary duct into a bypass duct.

15. An exhaust gas turbocharger according to claim 9, wherein the driving pins extend parallel to the axis of rotation from the adjusting ring to a groove of the casing wall and penetrate oblong holes arranged in the partition and driving openings, and rollers are provided in dispose the driving pins are disposed in the groove.

16. An exhaust gas turbocharger according to claim 10, wherein the driving pins extend parallel to the axis of rotation from the adjusting ring to a groove of the casing wall and penetrate oblong holes arranged in the partition and driving openings, and rollers are provided to dispose the driving pins are disposed in the groove.

17. An exhaust gas turbocharger according to claim 11, wherein the partition is fastened to the guide blade support by screws and spacing sleeves.

18. An exhaust gas turbocharger according to claim 12, wherein the partition is fastened to the guide blade support by screws and spacing sleeves.

19. An exhaust gas turbocharger according to claim 11, wherein stops arranged on the guide blade support limit guide blade adjustment.

20. An exhaust gas turbocharger according to claim 12, wherein stops arranged on the guide blade support limit guide blade adjustment.

* * * * *